United States Patent
Watarai et al.

(10) Patent No.: US 9,903,522 B2
(45) Date of Patent: Feb. 27, 2018

(54) BICYCLE HYDRAULIC HOSE CAP AND BICYCLE HYDRAULIC HOSE ASSEMBLY

(71) Applicant: SHIMANO INC., Sakai (JP)

(72) Inventors: Etsuyoshi Watarai, Sakai (JP); Osamu Kariyama, Sakai (JP); Nobuyoshi Fujii, Sakai (JP); Shinya Hirotomi, Sakai (JP); Takahiro Yamashita, Sakai (JP); Masahiro Nakakura, Sakai (JP); Hideki Ikemoto, Sakai (JP)

(73) Assignee: SHIMANO INC., Sakai (JP)

( * ) Notice: Subject to any disclaimer, the term of this patent is extended or adjusted under 35 U.S.C. 154(b) by 78 days.

(21) Appl. No.: 15/042,176

(22) Filed: Feb. 12, 2016

(65) Prior Publication Data

US 2017/0234473 A1   Aug. 17, 2017

(51) Int. Cl.
| | | |
|---|---|---|
| *F16L 55/10* | (2006.01) | |
| *F16L 55/115* | (2006.01) | |
| *B62J 99/00* | (2009.01) | |
| *F16L 55/04* | (2006.01) | |

(52) U.S. Cl.
CPC ............. *F16L 55/115* (2013.01); *B62J 99/00* (2013.01); *F16L 55/04* (2013.01)

(58) Field of Classification Search
CPC .................................................. F16L 55/053
USPC ................................ 138/26, 30, 31; 188/275
See application file for complete search history.

(56) References Cited

U.S. PATENT DOCUMENTS

| | | | | |
|---|---|---|---|---|
| 315,453 A | * | 4/1885 | Waddell ........................ 138/28 |
| 2,570,108 A | * | 10/1951 | Gallot ..................... B60C 29/06 | 116/34 R |
| 3,136,340 A | * | 6/1964 | Wildi ......................... F15B 1/24 | 138/31 |
| 3,556,159 A | * | 1/1971 | Bleasdale ............. F16L 55/052 | 138/30 |
| 3,613,734 A | * | 10/1971 | Elmer ....................... F15B 1/24 | 138/31 |
| 4,364,416 A | * | 12/1982 | Jacobellis ................. F15B 1/10 | 138/30 |
| 4,427,028 A | * | 1/1984 | Jacobellis ................. F15B 1/14 | 138/30 |
| 4,448,217 A | * | 5/1984 | Mercier .................... F15B 1/10 | 138/30 |
| 4,819,698 A | * | 4/1989 | Ismert .................... F16L 55/053 | 138/26 |
| 6,095,195 A | * | 8/2000 | Park ...................... F16L 55/053 | 138/30 |
| 6,581,948 B2 | * | 6/2003 | Fox ......................... B62K 25/04 | 188/275 |
| 8,434,524 B2 | * | 5/2013 | Barth ........................ F15B 1/04 | 138/26 |
| 2003/0000588 A1 | * | 1/2003 | Kuykendal ............. F16L 55/05 | 138/26 |

(Continued)

FOREIGN PATENT DOCUMENTS

| | | |
|---|---|---|
| DE | 20 2006 013 183 U1 | 10/2006 |
| DE | 20 2014 102 999 U1 | 10/2014 |

*Primary Examiner* — Patrick F Brinson
(74) *Attorney, Agent, or Firm* — Mori & Ward, LLP

(57) ABSTRACT

A bicycle hydraulic hose cap comprises a hose attachment to be detachably attached to an end of a hydraulic hose, and a reservoir including a fluid chamber having a variable internal volume. The fluid chamber is connected to a fluid passageway of the hydraulic hose in an attachment state where the hose attachment is attached to the end of the hydraulic hose.

22 Claims, 15 Drawing Sheets

(56) References Cited

U.S. PATENT DOCUMENTS

| | | | | |
|---|---|---|---|---|
| 2011/0067965 A1* | 3/2011 | McAndrews | ........ | B62K 25/08 188/275 |
| 2012/0085449 A1* | 4/2012 | Barth | ................ | F15B 1/04 138/30 |
| 2012/0192979 A1* | 8/2012 | Barth | ................ | F15B 1/04 138/30 |

* cited by examiner

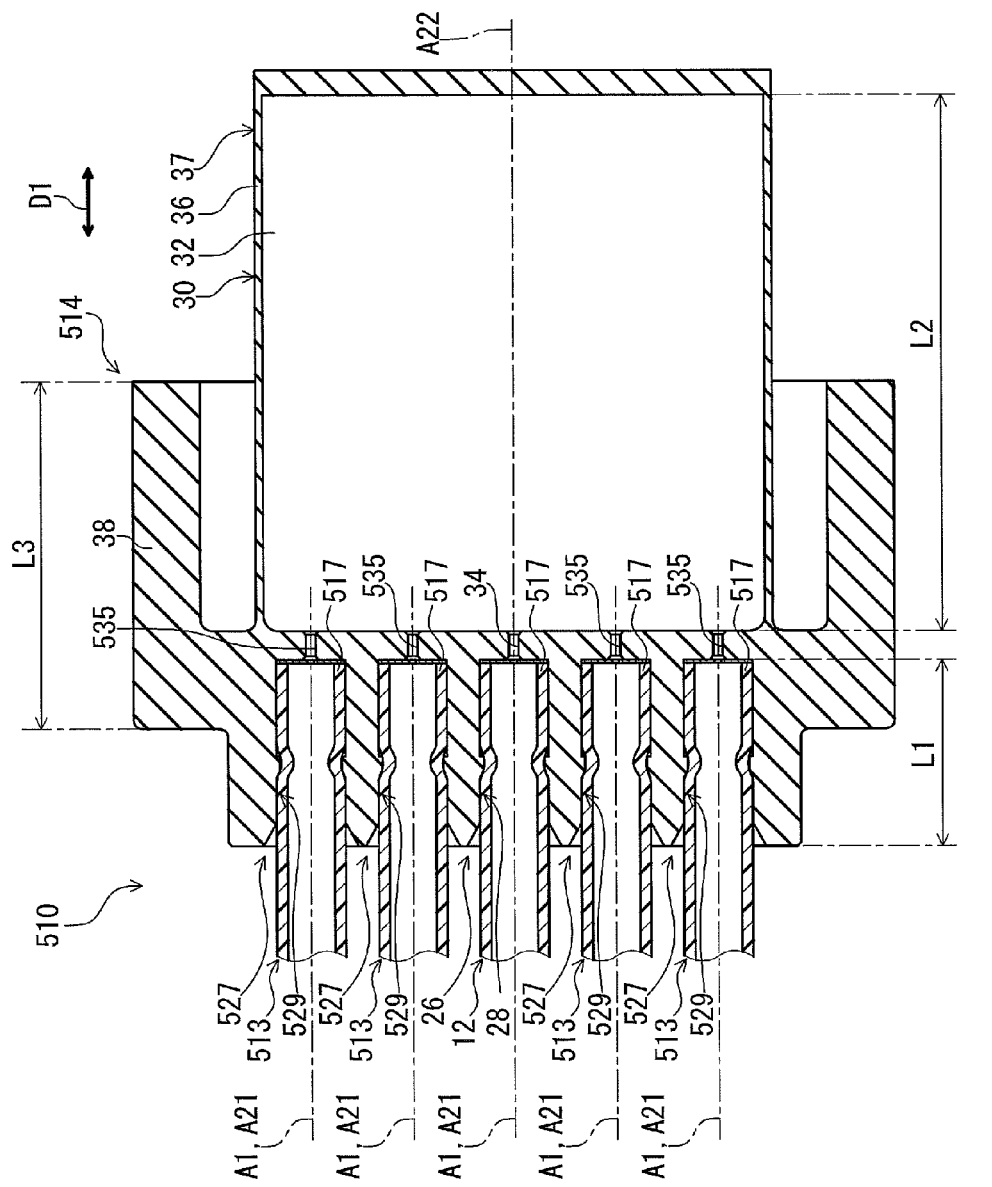

BICYCLE HYDRAULIC HOSE CAP AND BICYCLE HYDRAULIC HOSE ASSEMBLY

BACKGROUND OF THE INVENTION

Field of the Invention

The present invention relates to a bicycle hydraulic hose cap and a bicycle hydraulic hose assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hydraulic hose assembly.

SUMMARY OF THE INVENTION

In accordance with a first aspect of the present invention, a bicycle hydraulic hose cap comprises a hose attachment to be detachably attached to an end of a hydraulic hose, and a reservoir including a fluid chamber having a variable internal volume. The fluid chamber is connected to a fluid passageway of the hydraulic hose in an attachment state where the hose attachment is attached to the end of the hydraulic hose.

With the bicycle hydraulic hose cap according to the first aspect, the variable internal volume of the fluid chamber allows the fluid chamber to absorb a change in a volume of fluid provided in the fluid passageway of the hydraulic hose. Accordingly, it is possible to prevent the fluid provided in the fluid passageway from escaping from the hydraulic hose even if the change in the volume of the fluid chamber increases due to a change in temperature of the fluid.

In accordance with a second aspect of the present invention, the bicycle hydraulic hose cap according to the first aspect is configured so that the reservoir includes a deformable portion which is elastically deformable to vary the variable internal volume.

With the bicycle hydraulic hose cap according to the second aspect, it is possible to recognize the variable internal volume with a simple structure.

In accordance with a third aspect of the present invention, the bicycle hydraulic hose cap according to the second aspect is configured so that the reservoir includes a tubular part extending from the hose attachment. The tubular part includes the deformable portion.

With the bicycle hydraulic hose cap according to the third aspect, it is possible to easily provide the deformable portion.

In accordance with a fourth aspect of the present invention, the bicycle hydraulic hose cap according to the second or third aspect is configured so that a maximum thickness of the deformable portion is smaller than a maximum thickness of the hose attachment in a radial direction defined relative to a center axis of the end of the hydraulic hose.

With the bicycle hydraulic hose cap according to the fourth aspect, it is possible to provide the deformable portion with maintaining the strength of the hose attachment.

In accordance with a fifth aspect of the present invention, the bicycle hydraulic hose cap according to any one of the first to fourth aspects is configured so that the hose attachment includes an attachment hole in which the end of the hydraulic hose is inserted.

With the bicycle hydraulic hose cap according to the fifth aspect, it is possible to stably attach the end of the hydraulic hose to the hose attachment via the attachment hole.

In accordance with a sixth aspect of the present invention, the bicycle hydraulic hose cap according to the fifth aspect is configured so that the hose attachment includes a communication hole connecting the attachment hole to the fluid chamber.

With the bicycle hydraulic hose cap according to the sixth aspect, it is possible to absorb the change in the volume of the fluid via the communication hole and the variable internal volume.

In accordance with a seventh aspect of the present invention, the bicycle hydraulic hose cap according to the sixth aspect is configured so that an inner diameter of the communication hole is in a range from 0.1 mm to 3 mm.

With the bicycle hydraulic hose cap according to the seventh aspect, it is possible to allow the fluid to pass through the communication hole and prevent the fluid from flowing out from the reservoir in accordance with necessity.

In accordance with an eighth aspect of the present invention, the bicycle hydraulic hose cap according to the fifth to seventh aspects is configured so that the attachment hole has a first axial length in an axial direction. The fluid chamber has a second axial length in the axial direction. The second axial length is larger than the first axial length.

With the bicycle hydraulic hose cap according to the eighth aspect, it is possible to make the variable internal volume of the fluid chamber larger. This allows the fluid chamber to absorb a larger change in the volume of the fluid provided in the hydraulic hose.

In accordance with a ninth aspect of the present invention, the bicycle hydraulic hose cap according to the eighth aspect is configured so that a rate of the second axial length to the first axial length is in a range from 110% to 400%.

With the bicycle hydraulic hose cap according to the ninth aspect, it is possible to absorb the larger change in the volume of the fluid provided in the hydraulic hose with making the bicycle hydraulic hose cap compact.

In accordance with a tenth aspect of the present invention, the bicycle hydraulic hose cap according to any one of the fifth to ninth aspects is configured so that the attachment hole includes a first center axis. The attachment hole has a first diameter relative to the first center axis. The fluid chamber has a second diameter relative to the first center axis. The second diameter is larger than the first diameter.

With the bicycle hydraulic hose cap according to the tenth aspect, it is possible to make the variable internal volume of the fluid chamber larger with making the fluid chamber compact in an axial direction parallel to the first center axis.

In accordance with an eleventh aspect of the present invention, the bicycle hydraulic hose cap according to the tenth aspect is configured so that a rate of the second diameter to the first diameter is in a range from 105% to 200%.

With the bicycle hydraulic hose cap according to the eleventh aspect, it is possible to absorb a larger change in the volume of the fluid provided in the hydraulic hose with making the bicycle hydraulic hose cap compact.

In accordance with a twelfth aspect of the present invention, the bicycle hydraulic hose cap according to any one of the first to eleventh aspects is configured so that the reservoir is integrally provided with the hose attachment as a one-piece unitary member.

With the bicycle hydraulic hose cap according to the twelfth aspect, it is possible to easily form the reservoir.

In accordance with a thirteenth aspect of the present invention, the bicycle hydraulic hose cap according to any one of the first to twelfth aspects is configured so that the reservoir includes a reservoir body and a piston. The reservoir body includes a cylinder connected to the fluid passageway of the hydraulic hose in the attachment state where the hose attachment is attached to the end of the hydraulic hose. The piston is movably provided in the cylinder. The fluid chamber is defined by the reservoir body and the piston in the cylinder.

With the bicycle hydraulic hose cap according to the thirteenth aspect, it is possible to recognize the variable internal volume with a simple structure.

In accordance with a fourteenth aspect of the present invention, the bicycle hydraulic hose cap according to of the thirteenth aspect is configured so that the reservoir body is integrally provided with the hose attachment as a one-piece unitary member.

With the bicycle hydraulic hose cap according to the fourteenth aspect, it is possible to easily form the reservoir.

In accordance with a fifteenth aspect of the present invention, the bicycle hydraulic hose cap according to any one of the first to fourteenth aspects is configured so that the reservoir includes a balloon. The fluid chamber is provided in the balloon.

With the bicycle hydraulic hose cap according to the fifteenth aspect, it is possible to recognize the variable internal volume with a simple structure.

In accordance with a sixteenth aspect of the present invention, the bicycle hydraulic hose cap according to the fifteenth aspect is configured so that the balloon is integrally provided with the hose attachment as a one-piece unitary member.

With the bicycle hydraulic hose cap according to the sixteenth aspect, it is possible to easily form the reservoir.

In accordance with a seventeenth aspect of the present invention, the bicycle hydraulic hose cap according to any one of the first to sixteenth aspect further comprises an additional hose attachment to be detachably attached to an end of an additional hydraulic hose.

With the bicycle hydraulic hose cap according to the seventeenth aspect, the additional hose attachment allows the hydraulic hose to share the bicycle hydraulic hose cap with the additional hydraulic hose. Accordingly, it is possible to ship the bicycle hydraulic hose assembly with a plurality of hydraulic hoses.

In accordance with an eighteenth aspect of the present invention, a bicycle hydraulic hose assembly comprises a hydraulic hose and a bicycle hydraulic hose cap. The hydraulic hose includes a fluid passageway. The bicycle hydraulic hose cap comprises a hose attachment to be detachably attached to an end of the hydraulic hose, and a reservoir including a fluid chamber having a variable internal volume. The fluid chamber is connected to the fluid passageway of the hydraulic hose in an attachment state where the hose attachment is attached to the end of the hydraulic hose.

With the bicycle hydraulic hose assembly according to the eighteenth aspect, the variable internal volume of the fluid chamber allows the fluid chamber to absorb a change in a volume of fluid provided in the fluid passageway of the hydraulic hose. Accordingly, it is possible to prevent the fluid provided in the fluid passageway from escaping from the hydraulic hose even if the change in the volume of the fluid chamber increases due to a change in temperature of the fluid.

In accordance with a nineteenth aspect of the present invention, the bicycle hydraulic hose assembly according to the eighteenth aspect is configured so that the hydraulic hose includes a hose body and a film. The hose body defines the fluid passageway. The film is attached to an end of the hose body. The film includes a through-hole.

With the bicycle hydraulic hose assembly according to the nineteenth aspect, it is possible to keep a communication between the fluid chamber and the fluid passageway via the through-hole of the film in an attachment state where the bicycle hydraulic hose cap is attached to the end of the hose body of the hydraulic hose. Furthermore, it is possible to easily break the film to connect the hydraulic hose to a hydraulic component by utilizing an attachment action of the hydraulic hose to the hydraulic component.

In accordance with a twentieth aspect of the present invention, the bicycle hydraulic hose assembly according to the nineteenth aspect is configured so that an inner diameter of the through-hole is in a range from 0.1 mm to 3 mm.

With the bicycle hydraulic hose assembly according to the twentieth aspect, it is possible to allow the fluid to pass through the through-hole and prevent the fluid from flowing out from the hydraulic hose.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 15 is a partial cross-sectional view of a bicycle hydraulic hose assembly in accordance with a fifth embodiment.

DESCRIPTION OF THE EMBODIMENTS

Figure 1:
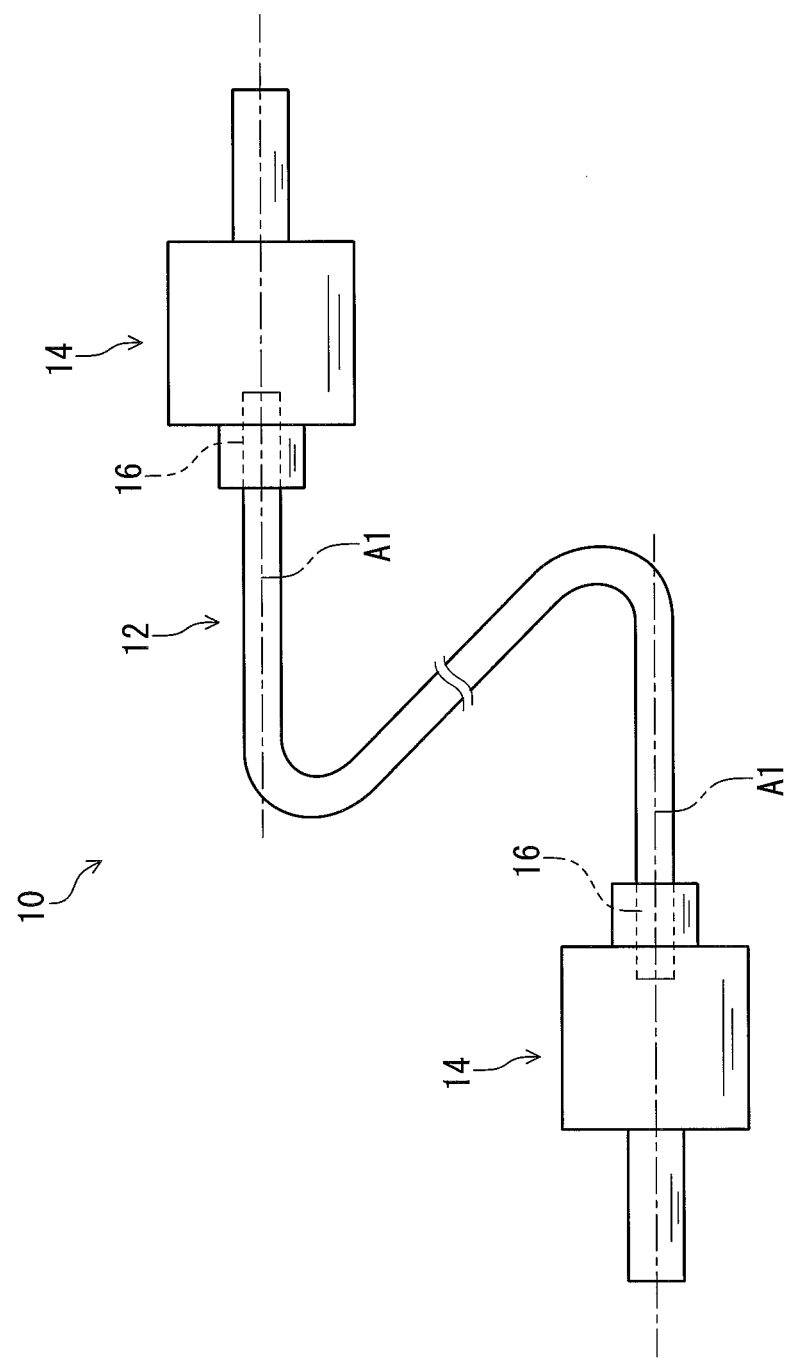
FIG. 1 is a plan view of a bicycle hydraulic hose assembly including a bicycle hydraulic hose cap in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle hydraulic hose assembly 10 in accordance with a first embodiment comprises a hydraulic hose 12 and a bicycle hydraulic hose cap 14. The bicycle hydraulic hose cap 14 is detachably attached to an end 16 of the hydraulic hose 12. In this embodiment, the bicycle hydraulic hose assembly 10 comprises a pair of bicycle hydraulic hose caps 14. The bicycle hydraulic hose caps 14 are detachably attached to ends 16 of the hydraulic hose 12, respectively. However, the bicycle hydraulic hose assembly 10 can comprise at least one bicycle hydraulic hose cap 14. One of the bicycle hydraulic hose caps 14 can be replaced with another cap having a structure different from the structure of the bicycle hydraulic hose cap 14 or can be replaced with a film having no any holes simply.

Figure 2:
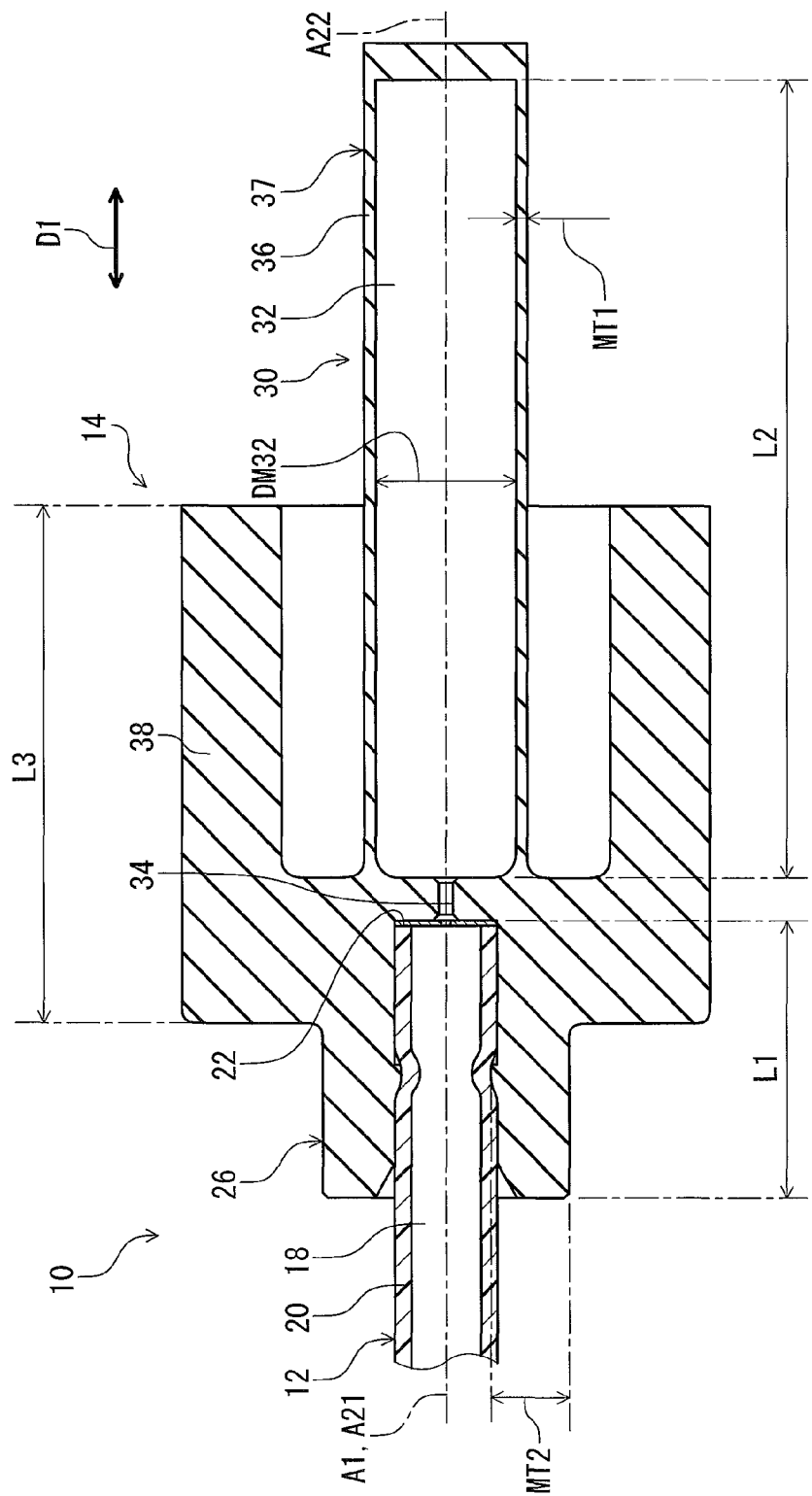
FIG. 2 is a partial cross-sectional view of the bicycle hydraulic hose assembly illustrated in FIG. 1.
Figure 3:
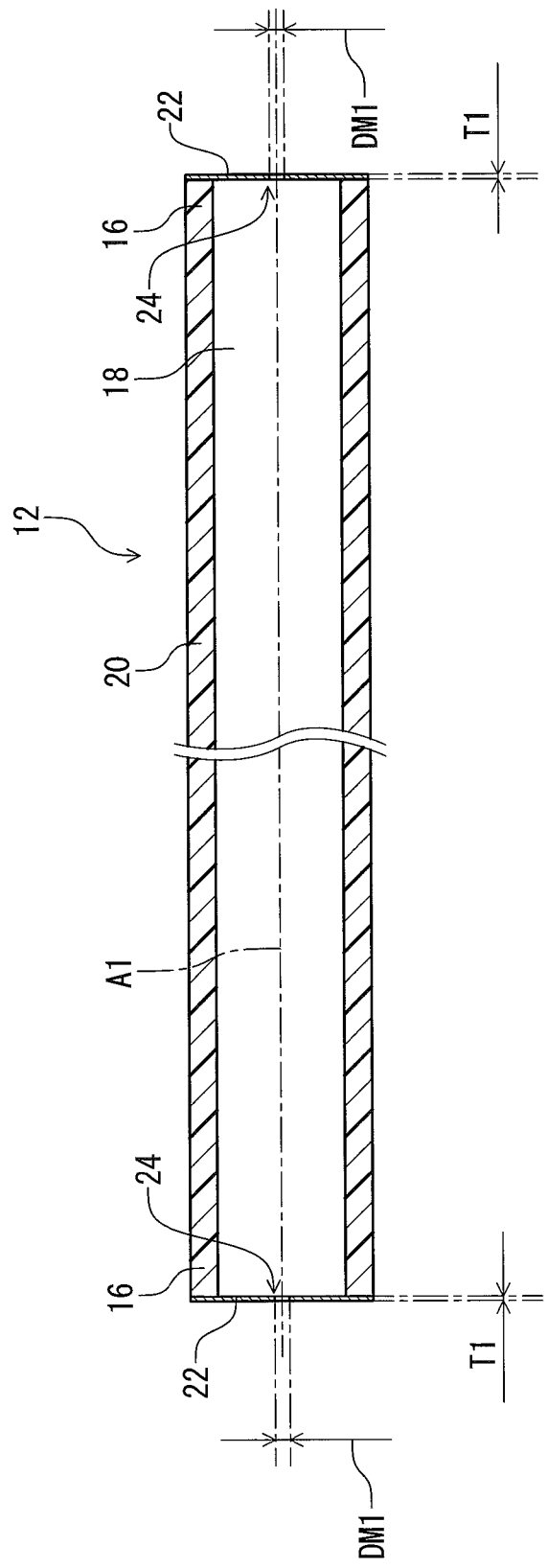
FIG. 3 is a cross-sectional view of a hydraulic hose of the bicycle hydraulic hose assembly illustrated in FIG. 1.

As seen in FIGS. 2 and 3, the hydraulic hose 12 includes a fluid passageway 18. The hydraulic hose 12 includes a hose body 20 defining the fluid passageway 18. For example, the hose body 20 has a tubular shape. Each of the ends 16 of the hydraulic hose 12 has a center axis A1.

As seen in FIG. 3, the hydraulic hose 12 includes a film 22 attached to an end 16 of the hose body 20. For example, the film 22 is made of a metallic material such as aluminum and copper. The film 22 has a thickness T1. While the hydraulic hose 12 includes a pair of films 22 in this embodiment, the hydraulic hose 12 can include at least one film 22. One of the films 22 can be replaced with another member having a structure different from the structure of the film 22.

The film 22 includes a through-hole 24. An inner diameter DM1 of the through-hole 24 is in a range from 0.1 mm to 3 mm. However, the inner diameter DM1 of the through-hole 24 is not limited to this embodiment. The inner diameter DM1 of the through-hole 24 can be in a range different from the range from 0.1 mm to 3 mm. The inner diameter DM1 of the through-hole 24 can be in a range from approximately 0.1 mm to approximately 3 mm. The inner diameter DM1 of the through-hole 24 is preferably in a range from 0.3 mm to 2 mm, more preferably in a range from 0.5 mm to 1 mm.

Figure 4:
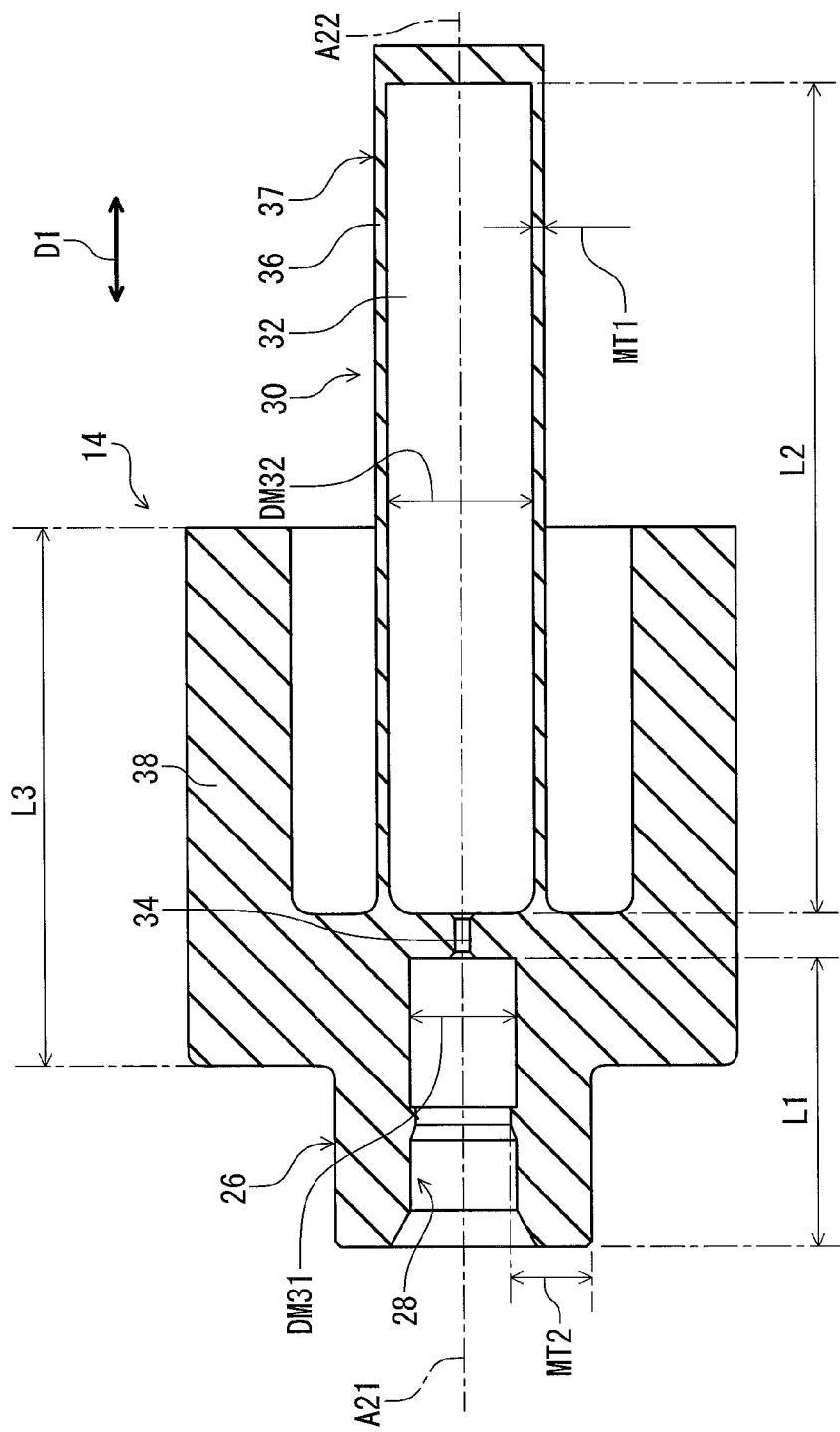
FIG. 4 is a cross-sectional view of the bicycle hydraulic hose cap of the bicycle hydraulic hose assembly illustrated in FIG. 1.

As seen in FIG. 4, the bicycle hydraulic hose cap 14 comprises a hose attachment 26 to be detachably attached to the end 16 of the hydraulic hose 12. The hose attachment 26 includes an attachment hole 28 in which the end 16 of the hydraulic hose 12 is inserted. The attachment hole 28 includes a first center axis A21. The attachment hole 28 extends in an axial direction D1 parallel to the first center axis A21. The first center axis A21 of the attachment hole 28 coincides with the center axis A1 of the end 16 of the hydraulic hose 12 in an attachment state where the bicycle hydraulic hose cap 14 is attached to the end 16 of the hydraulic hose 12. However, the first center axis A21 of the attachment hole 28 can be offset from the center axis A1 of the end 16 of the hydraulic hose 12 in the attachment state.

The bicycle hydraulic hose cap 14 comprises a reservoir 30 including a fluid chamber 32. In this embodiment, the reservoir 30 is integrally provided with the hose attachment 26 as a one-piece unitary member. However, the reservoir 30 can be integrally provided with the hose attachment 26 as a one-piece unitary member.

The fluid chamber 32 has a variable internal volume. The fluid chamber 32 is connected to the fluid passageway 18 of the hydraulic hose 12 in the attachment state where the hose attachment 26 is attached to the end 16 of the hydraulic hose 12. The hose attachment 26 includes a communication hole 34 connecting the attachment hole 28 to the fluid chamber 32.

In this embodiment, the reservoir 30 includes a deformable portion 36 which is elastically deformable to vary the variable internal volume. The reservoir 30 includes a tubular part 37 extending from the hose attachment 26. The tubular part 37 includes the deformable portion 36. The deformable portion 36 is made of an elastomer such as TPS, TPO, TPVC, TPEE, TPU and TPA. However, the deformable portion 36 can be made of materials other than the elastomer.

Figure 5:
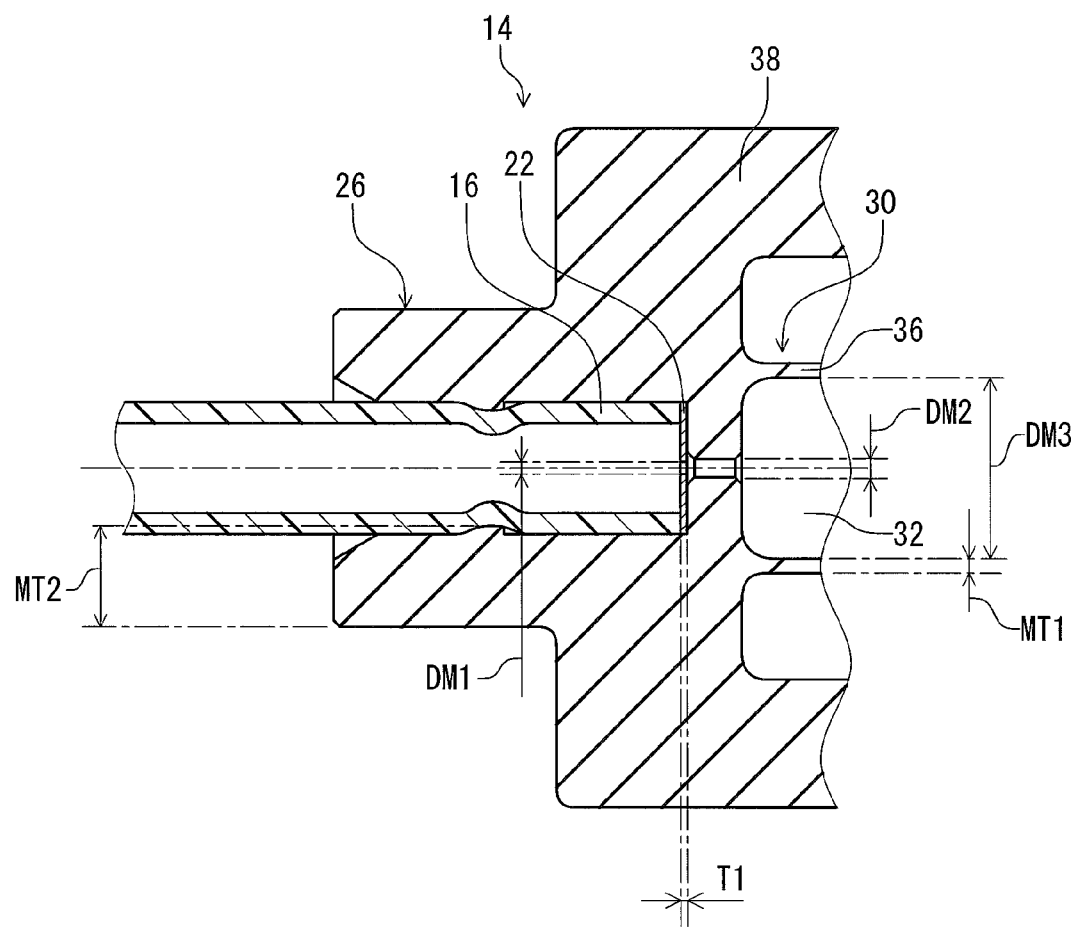
FIG. 5 is a partial enlarged cross-sectional view of the bicycle hydraulic hose assembly illustrated in FIG. 1.

As seen in FIG. 5, an inner diameter DM2 of the communication hole 34 is in a range from 0.1 mm to 3 mm. However, the inner diameter DM2 of the communication hole 34 is not limited to this embodiment. The inner diameter DM2 of the communication hole 34 can be in a range different from the range from 0.1 mm to 3 mm. The inner diameter DM2 of the communication hole 34 can be in a range from approximately 0.1 mm to approximately 3 mm. The inner diameter DM2 of the communication hole 34 is preferably in a range from 0.3 mm to 2 mm, more preferably in a range from 0.5 mm to 1 mm. In this embodiment, the inner diameter DM2 of the communication hole 34 is larger than the inner diameter DM1 of the through-hole 24 of the film 22. However, the inner diameter DM2 of the communication hole 34 can be equal to or smaller than the inner diameter DM1 of the through-hole 24 of the film 22.

A maximum thickness MT1 of the deformable portion 36 is smaller than a maximum thickness MT2 of the hose attachment 26 in a radial direction defined relative to the center axis A1 of the end 16 of the hydraulic hose 12. The tubular part 37 includes a second center axis A22. In this embodiment, the second center axis A22 of the tubular part 37 coincides with the first center axis A21 of the attachment hole 28. However, the second center axis A22 of the tubular part 37 can be offset from the first center axis A21 of the attachment hole 28. The maximum thickness MT1 of the deformable portion 36 is smaller than the maximum thickness MT2 of the hose attachment 26 in a radial direction defined relative to the second center axis A22 of the tubular part 37. The thickness T1 of the film 22 is smaller than the maximum thickness MT1 and the maximum thickness MT2.

The attachment hole 28 has a first axial length L1 in the axial direction D1. The fluid chamber 32 has a second axial length L2 in the axial direction D1. The second axial length L2 is larger than the first axial length L1. A rate of the second axial length L2 to the first axial length L1 is in a range from 110% to 400%. However, the second axial length L2 can be equal to or shorter than the first axial length L1. The rate of the second axial length L2 to the first axial length L1 is not limited to this embodiment. The rate of the second axial length L2 to the first axial length L1 can be in a range different from the range from 110% to 400%. The rate of the second axial length L2 to the first axial length L1 can be in a range from approximately 110% to approximately 400%.

The attachment hole 28 has a first diameter DM31 relative to the first center axis A21. The fluid chamber 32 has a second diameter DM32 relative to the first center axis A21. The second diameter DM32 is larger than the first diameter DM31. However, the second diameter DM32 can be equal to or smaller than the first diameter DM31. A rate of the second diameter DM32 to the first diameter DM31 is in a range from 105% to 200%. However, the rate of the second diameter DM32 to the first diameter DM31 is not limited to this embodiment. The rate of the second diameter DM32 to the first diameter DM31 can be in a range different from the range from 105% to 200%. The rate of the second diameter DM32 to the first diameter DM31 can be in a range from approximately 105% to approximately 200%.

As seen in FIG. 4, the bicycle hydraulic hose cap 14 comprises a gripping part 38 to be gripped by a user when the hydraulic hose 12 is attached to or detached from the hose attachment 26 of the bicycle hydraulic hose cap 14. The gripping part 38 has an annular shape and extends from the hose attachment 26 in the axial direction D1. The gripping part 38 is provided radially outward of the reservoir 30. While the gripping part 38 is integrally provided with the hose attachment 26 and the reservoir 30 in this embodiment, the gripping part 38 can be a separate member from at least one of the hose attachment 26 and the reservoir 30.

The gripping part 38 has a third axial length L3 defined in the axial direction D1. The third axial length L3 is longer than the first axial length L1 but shorter than the second axial length L2. However, the third axial length L3 can be equal to or shorter than the first axial length L1. The third axial length L3 can be equal to or longer than the second axial length L2.

The bicycle hydraulic hose assembly 10 and the bicycle hydraulic hose cap 14 include the following features.

(1) The bicycle hydraulic hose cap 14 comprises the reservoir 30 including the fluid chamber 32 having the variable internal volume. The fluid chamber 32 is connected to the fluid passageway 18 of the hydraulic hose 12 in the attachment state where the hose attachment 26 is attached to the end 16 of the hydraulic hose 12. The variable internal volume of the fluid chamber 32 allows the fluid chamber 32 to absorb a change in a volume of fluid provided in the fluid passageway 18 of the hydraulic hose 12. Accordingly, it is possible to prevent the fluid provided in the fluid passageway 18 from escaping from the hydraulic hose 12 even if the change in the volume of the fluid chamber 32 increases due to a change in temperature of the fluid.

(2) The reservoir 30 includes the deformable portion 36 which is elastically deformable to vary the variable internal volume. Accordingly, it is possible to recognize the variable internal volume with a simple structure.

(3) The reservoir 30 includes the tubular part 37 extending from the hose attachment 26. The tubular part 37 includes the deformable portion 36. Accordingly, it is possible to easily provide the deformable portion 36.

(4) The maximum thickness MT1 of the deformable portion 36 is smaller than the maximum thickness MT2 of the hose attachment 26 in the radial direction defined relative to the center axis A1 of the end 16 of the hydraulic hose 12. Accordingly, it is possible to provide the deformable portion 36 with maintaining the strength of the hose attachment 26.

(5) The hose attachment 26 includes the attachment hole 28 in which the end 16 of the hydraulic hose 12 is inserted. Accordingly, it is possible to stably attach the end 16 of the hydraulic hose 12 to the hose attachment 26 via the attachment hole 28.

(6) The hose attachment 26 includes the communication hole 34 connecting the attachment hole 28 to the fluid chamber 32. Accordingly, it is possible to absorb the change in the volume of the fluid via the communication hole 34 and the variable internal volume.

(7) The inner diameter DM2 of the communication hole 34 is in the range from 0.1 mm to 3 mm. Accordingly, it is possible to allow the fluid to pass through the communication hole 34 and prevent the fluid from flowing out from the reservoir 30 in accordance with necessity.

(8) The attachment hole 28 has the first axial length L1 in the axial direction D1. The fluid chamber 32 has the second axial length L2 in the axial direction D1. The second axial length L2 is larger than the first axial length L1. Accordingly, it is possible to make the variable internal volume of the fluid chamber 32 larger. This allows the fluid chamber 32 to absorb a larger change in the volume of the fluid provided in the hydraulic hose 12.

(9) The rate of the second axial length L2 to the first axial length L1 is in the range from 110% to 400%. Accordingly, it is possible to absorb the larger change in the volume of the fluid provided in the hydraulic hose 12 with making the bicycle hydraulic hose cap 14 compact.

(10) The attachment hole 28 has the first diameter DM31 relative to the center axis A1. The fluid chamber 32 has the second diameter DM32 relative to the center axis A1. The second diameter DM32 is larger than the first diameter DM31. Accordingly, it is possible to make the variable internal volume of the fluid chamber 32 larger with making the fluid chamber 32 compact in an axial direction D1 parallel to the center axis A1.

(11) The rate of the second diameter DM32 to the first diameter DM31 is in the range from 105% to 200%. Accordingly, it is possible to absorb a larger change in the volume of the fluid provided in the hydraulic hose 12 with making the bicycle hydraulic hose cap 14 compact.

(12) Since the reservoir 30 is integrally provided with the hose attachment 26 as a one-piece unitary member, it is possible to easily form the reservoir 30.

(13) With the bicycle hydraulic hose assembly 10, the variable internal volume of the fluid chamber 32 allows the fluid chamber 32 to absorb a change in a volume of fluid provided in the fluid passageway 18 of the hydraulic hose 12. Accordingly, it is possible to prevent the fluid provided in the fluid passageway 18 from escaping from the hydraulic hose 12 even if the change in the volume of the fluid chamber 32 increases due to a change in temperature of the fluid.

(14) The hydraulic hose 12 includes the hose body 20 defining the fluid passageway 18, and the film 22 attached to the end 16 of the hose body 20. The film 22 includes the through-hole 24. Accordingly, it is possible to keep a communication between the fluid chamber 32 and the fluid passageway 18 via the through-hole 24 of the film 22 in an attachment state where the bicycle hydraulic hose cap 14 is attached to the end 16 of the hose body 20 of the hydraulic hose 12. Furthermore, it is possible to easily break the film 22 to connect the hydraulic hose 12 to a hydraulic component by utilizing an attachment action of the hydraulic hose 12 to the hydraulic component.

(15) The inner diameter DM1 of the through-hole 24 is in the range from 0.1 mm to 3 mm. Accordingly, it is possible to allow the fluid to pass through the through-hole 24 and prevent the fluid from flowing out from the hydraulic hose 12.

Second Embodiment

A bicycle hydraulic hose assembly 210 comprising a bicycle hydraulic hose cap 214 in accordance with a second embodiment will be described below referring to FIG. 6. The bicycle hydraulic hose cap 214 has the same structure as that of the bicycle hydraulic hose cap 14 except for the reservoir 30. Thus, elements having substantially the same function as those in the first embodiment will be numbered the same here, and will not be described and/or illustrated again in detail here for the sake of brevity.

Figure 6:
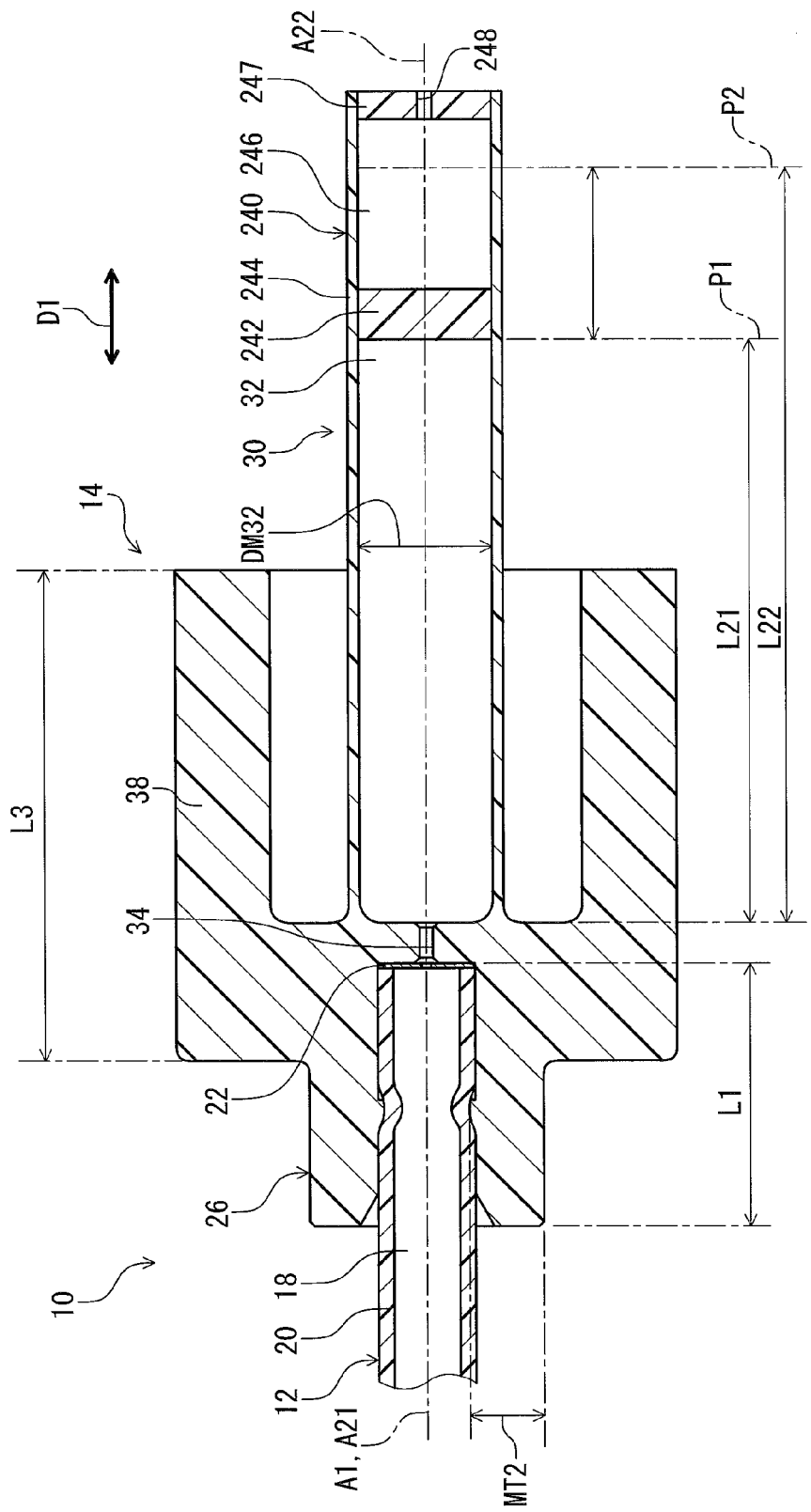
FIG. 6 is a partial cross-sectional view of a bicycle hydraulic hose assembly including a bicycle hydraulic hose cap in accordance with a second embodiment.

As seen in FIG. 6, the bicycle hydraulic hose cap 214 comprises a reservoir 230 including a fluid chamber 232. The fluid chamber 232 has a variable internal volume. The fluid chamber 232 is connected to the fluid passageway 18 of the hydraulic hose 12 in the attachment state where the hose attachment 26 is attached to the end 16 of the hydraulic hose 12.

The fluid chamber 232 has substantially the same structure as that of the fluid chamber 32 of the reservoir 30 of the first embodiment. Unlike the bicycle hydraulic hose cap 14 of the first embodiment, however, the reservoir 230 includes a reservoir body 240 and a piston 242. The reservoir body 240 includes a cylinder 244 connected to the fluid passageway 18 of the hydraulic hose 12 in the attachment state where the hose attachment 26 is attached to the end 16 of the hydraulic hose 12. The piston 242 is movably provided in the cylinder 244. The fluid chamber 232 is defined by the reservoir body 240 and the piston 242 in the cylinder 244. In this embodiment, the reservoir body 240 is integrally provided with the hose attachment 26 as a one-piece unitary member. However, the reservoir body 240 can be a separate member from the hose attachment 26.

The reservoir 232 includes an additional chamber 246 defined by the reservoir body 240 and the piston 242 in the cylinder 244. The additional chamber 246 is opposite to the fluid chamber 232 in the axial direction D1. The reservoir 230 includes an end member 247 attached to an end of the cylinder 244. The additional chamber 246 is defined by the piston 242, the cylinder 244, and the end member 247. The end member 247 includes an additional communication hole 248. The additional communication hole 248 connects the additional chamber 246 to an outside space of the reservoir 232.

The piston 242 is movably provided in the cylinder 244 between a first position P1 and a second position P2. The fluid chamber 232 has a second axial length L21 in the axial direction D1 in a first state where the piston 244 is positioned at the first position P1. The fluid chamber 232 has a second axial length L22 in the axial direction D1 in a second state where the piston 244 is positioned at the second position P2. The second axial length L21 is larger than the first axial length L1. The second axial length L22 is larger than the first axial length L1. The first position P1 of the piston 242 is defined by a volume of the fluid provided in the fluid chamber 232 under normal temperature. The piston 242 is in contact with the end member 247 in the second state where the piston 242 is positioned at the second position P2.

With the bicycle hydraulic hose assembly 210 and the bicycle hydraulic hose cap 214, it is possible to obtain substantially the same effects as those of the bicycle hydraulic hose assembly 10 and the bicycle hydraulic hose cap 14 of the first embodiment.

Furthermore, the bicycle hydraulic hose cap 214 includes the following features.

(1) The reservoir 230 includes the reservoir body 240 and the piston 242. The reservoir body 240 includes the cylinder 244 connected to the fluid passageway 18 of the hydraulic hose 12 in the attachment state where the hose attachment 26 is attached to the end 16 of the hydraulic hose 12. The piston 242 is movably provided in the cylinder 244. The fluid chamber 232 is defined by the reservoir body 240 and the piston 242 in the cylinder 244. Accordingly, it is possible to recognize the variable internal volume with a simple structure.

(2) The reservoir body 240 is integrally provided with the hose attachment 26 as a one-piece unitary member. Accordingly, it is possible to easily form the reservoir 230.

Third Embodiment

A bicycle hydraulic hose assembly 310 comprising a bicycle hydraulic hose cap 314 in accordance with a third embodiment will be described below referring to FIGS. 7 to 10. The bicycle hydraulic hose cap 314 has the same structure as that of the bicycle hydraulic hose cap 14 except for the reservoir 30. Thus, elements having substantially the same function as those in the first embodiment will be numbered the same here, and will not be described and/or illustrated again in detail here for the sake of brevity.

Figure 7:
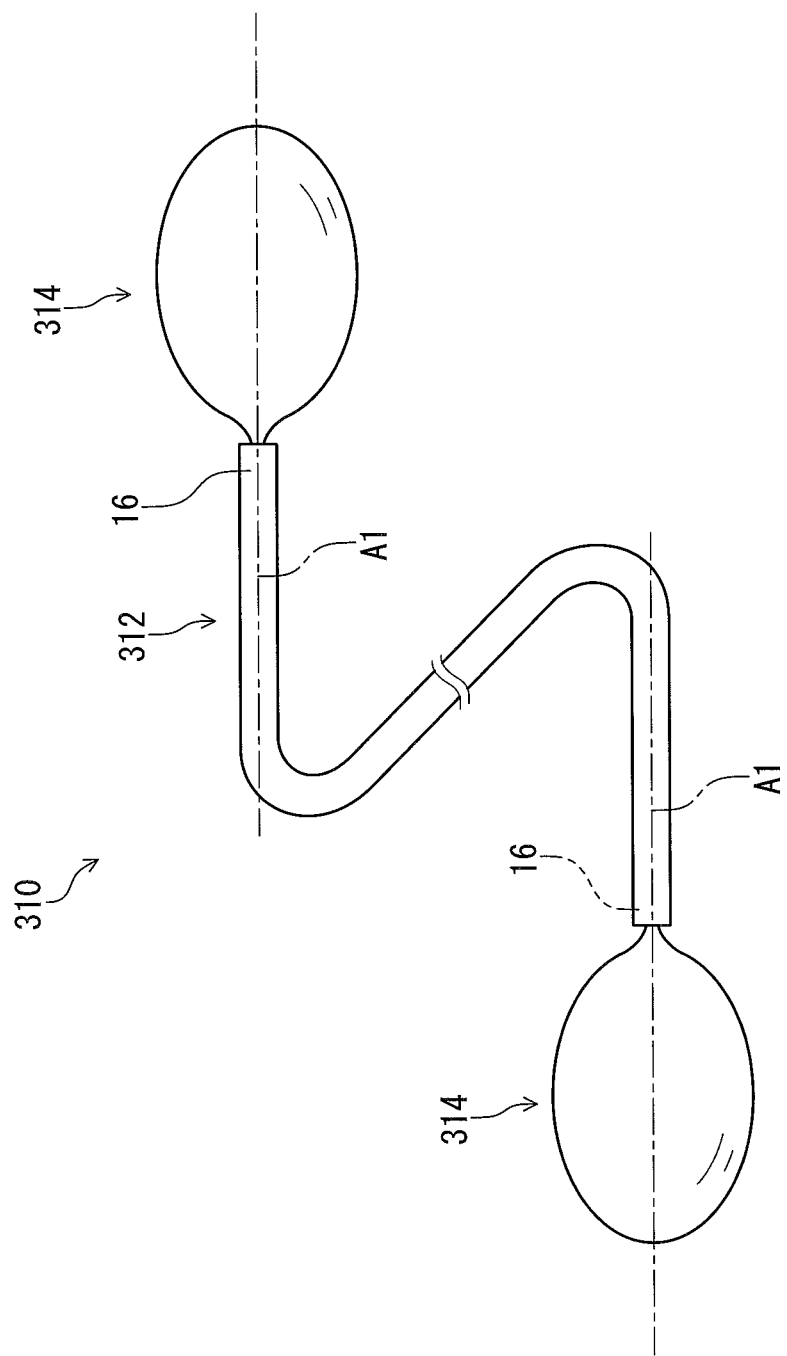
FIG. 7 is a plan view of a bicycle hydraulic hose assembly including a bicycle hydraulic hose cap in accordance with a third embodiment.
Figure 8:
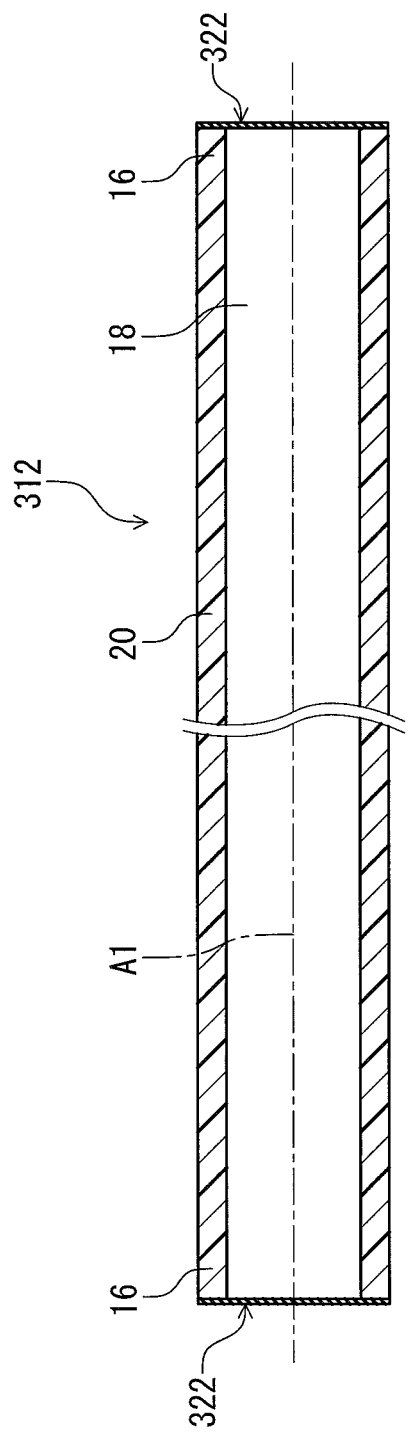
FIG. 8 is a cross-sectional view of a hydraulic hose of the bicycle hydraulic hose assembly illustrated in FIG. 7.

As seen in FIGS. 7 and 8, the bicycle hydraulic hose assembly 310 comprises a hydraulic hose 312 and the bicycle hydraulic hose cap 314. The hydraulic hose 312 includes an elastic part 322 instead of the film 22. The elastic part 322 is attached to the end 16 of the hose body 20 and is made of an elastic material such as rubber.

Figure 9:
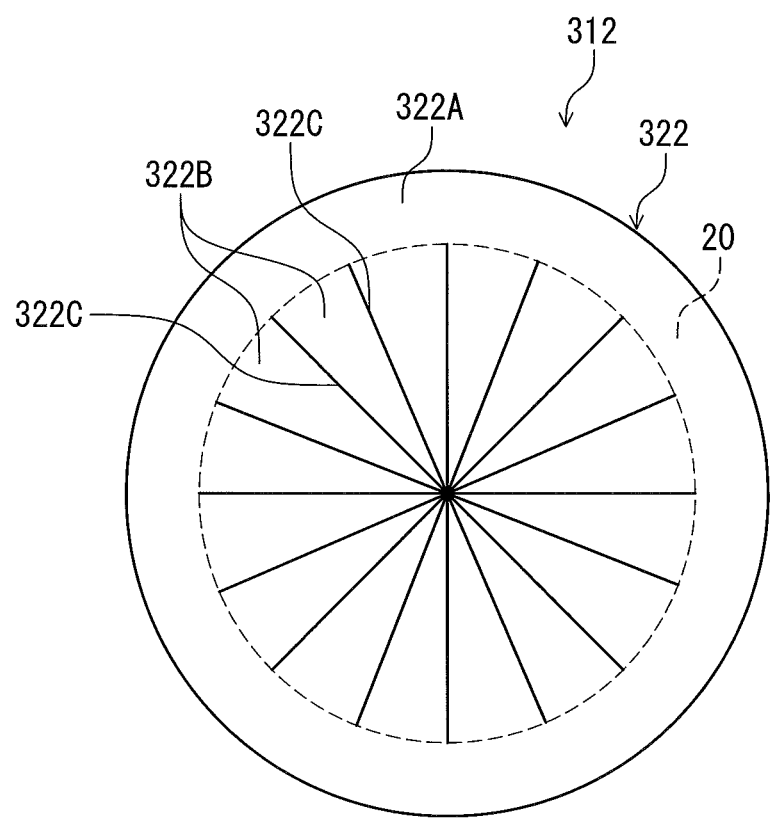
FIG. 9 is a side view of the hydraulic hose illustrated in FIG. 8.

As seen in FIG. 9, the elastic part 322 includes an annular portion 322A and sealing portions 322B. The annular portion 322A is attached to an end of the hose body 20. The sealing portions 322B extend radially inward from the annular portion 322A. The sealing portions 322B are deformable to provide a center opening in the elastic part 322. The elastic part 322 includes slits 322C. The slits 322C define the sealing portions 322B. The elastic part 322 holds the fluid in the fluid passageway 18 of the hydraulic hose 312 in a state where the bicycle hydraulic hose cap 314 is detached from the end 16 of the hydraulic hose 312.

Figure 10:
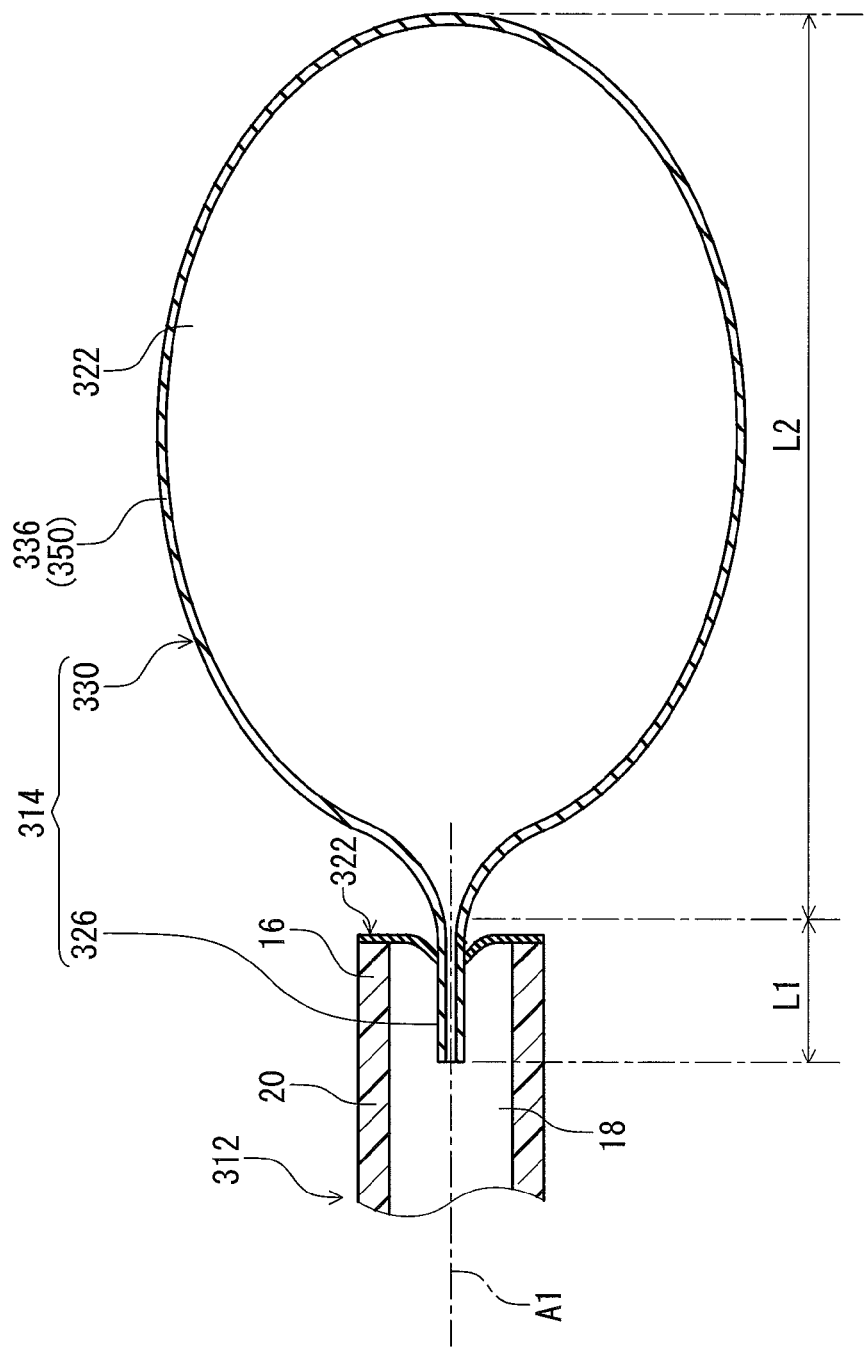
FIG. 10 is a partial cross-sectional view of the bicycle hydraulic hose assembly illustrated in FIG. 7.

As seen in FIG. 10, the bicycle hydraulic hose cap 314 comprises a hose attachment 326 to be detachably attached to the end 16 of the hydraulic hose 312. The hose attachment 326 extends through the opening provided by the sealing portions 322B of the elastic part 322 in a state where the bicycle hydraulic hose cap 314 is attached to the end 16 of the hydraulic hose 312.

The bicycle hydraulic hose cap 314 comprises a reservoir 330 including a fluid chamber 332. The fluid chamber 332 has a variable internal volume. The fluid chamber 332 is connected to the fluid passageway 18 of the hydraulic hose 312 in the attachment state where the hose attachment 326 is attached to the end 16 of the hydraulic hose 312. The reservoir 330 includes a deformable portion 336 which is elastically deformable to vary the variable internal volume.

Unlike the reservoir 30 of the first embodiment, however, the reservoir 330 includes a balloon 350 as the deformable portion 336. The fluid chamber 332 is provided in the balloon 350. The deformable portion 336 is made of an elastomer such as TPS, TPO, TPVC, TPEE, TPU and TPA. However, the deformable portion 336 can be made of materials other than the elastomer.

In this embodiment, the reservoir 330 is integrally provided with the hose attachment 326 as a one-piece unitary member. The balloon 350 is integrally provided with the hose attachment 326 as a one-piece unitary member. However, the reservoir 330 can be a separate member from the hose attachment 326. The balloon 350 can be a separate member from the hose attachment 326.

With the bicycle hydraulic hose assembly 310 and the bicycle hydraulic hose cap 314, it is possible to obtain substantially the same effects as those of the bicycle hydraulic hose assembly 10 and the bicycle hydraulic hose cap 14 of the first embodiment.

Furthermore, the bicycle hydraulic hose cap 314 includes the following features.

(1) The reservoir 330 is integrally provided with the hose attachment 326 as a one-piece unitary member. Accordingly, it is possible to easily form the reservoir 330.

(2) The reservoir 330 includes the balloon 350. The fluid chamber 332 is provided in the balloon 350. Accordingly, it is possible to recognize the variable internal volume with a simple structure.

(3) The balloon 350 is integrally provided with the hose attachment 326 as a one-piece unitary member. Accordingly, it is possible to easily form the reservoir 330.

Fourth Embodiment

A bicycle hydraulic hose assembly 410 comprising a bicycle hydraulic hose cap 414 in accordance with a fourth embodiment will be described below referring to FIGS. 11 to 14. The bicycle hydraulic hose cap 414 has the same structure as that of the bicycle hydraulic hose cap 314 except for the reservoir 330. Thus, elements having substantially the same function as those in the above embodiments will be numbered the same here, and will not be described and/or illustrated again in detail here for the sake of brevity.

Figure 11:
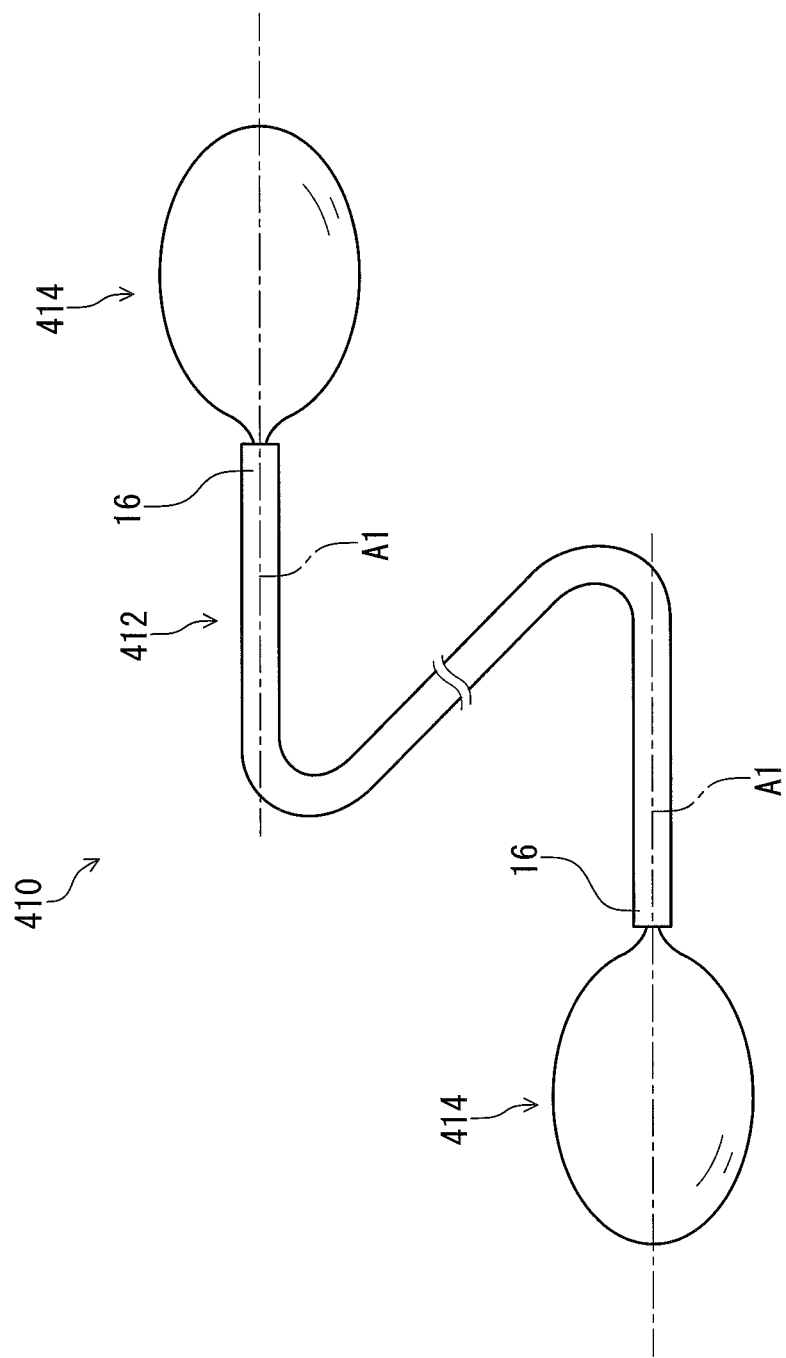
FIG. 11 is a plan view of a bicycle hydraulic hose assembly including a bicycle hydraulic hose cap in accordance with a fourth embodiment.
Figure 12:
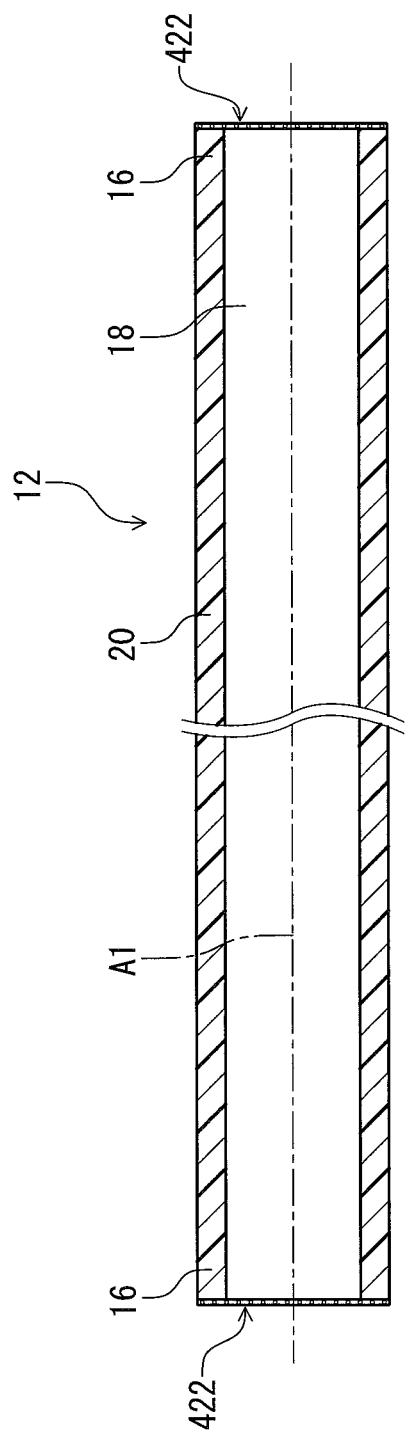
FIG. 12 is a cross-sectional view of a hydraulic hose of the bicycle hydraulic hose assembly illustrated in FIG. 11.

As seen in FIGS. 11 and 12, the bicycle hydraulic hose assembly 410 comprises a hydraulic hose 412 and the bicycle hydraulic hose cap 414. The hydraulic hose 412 includes a mesh part 422 instead of the elastic part 322.

Figure 13:
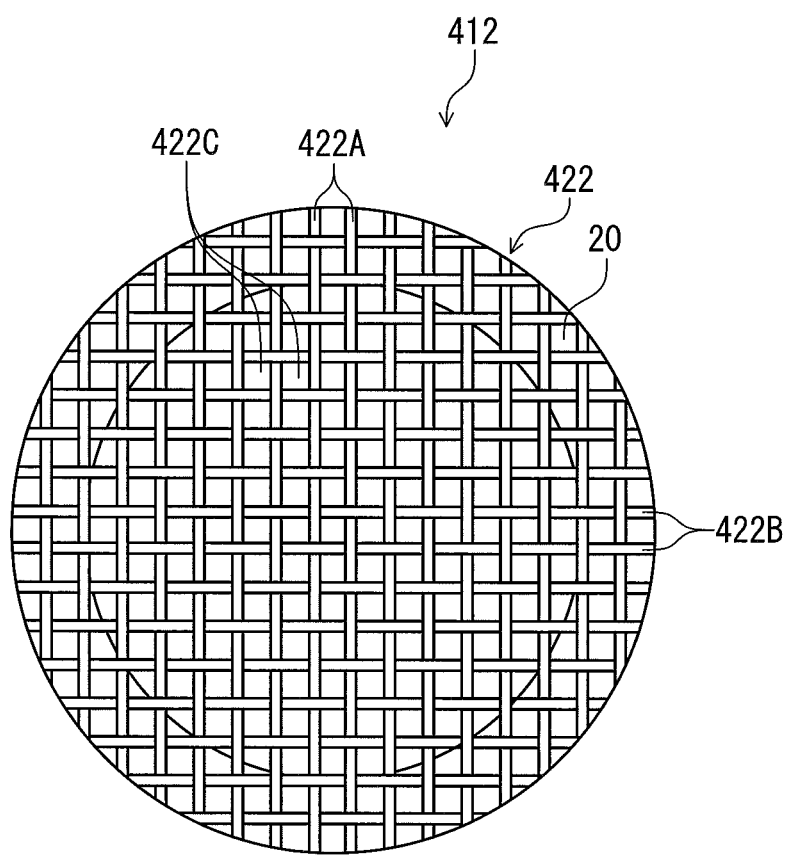
FIG. 13 is a side view of the hydraulic hose illustrated in FIG. 12.

As seen in FIG. 13, the mesh part 422 includes first wires 422A and second wires 422B. The first wires 422A extend in a first direction D41. The second wires 422B extend in a second direction D42 perpendicular to each of the first direction D41 and the axial direction D1. The first wires 422A and the second wires 422B provide holes 422C. The first wires 422A and the second wires 422B are made of a metallic material.

Figure 14:
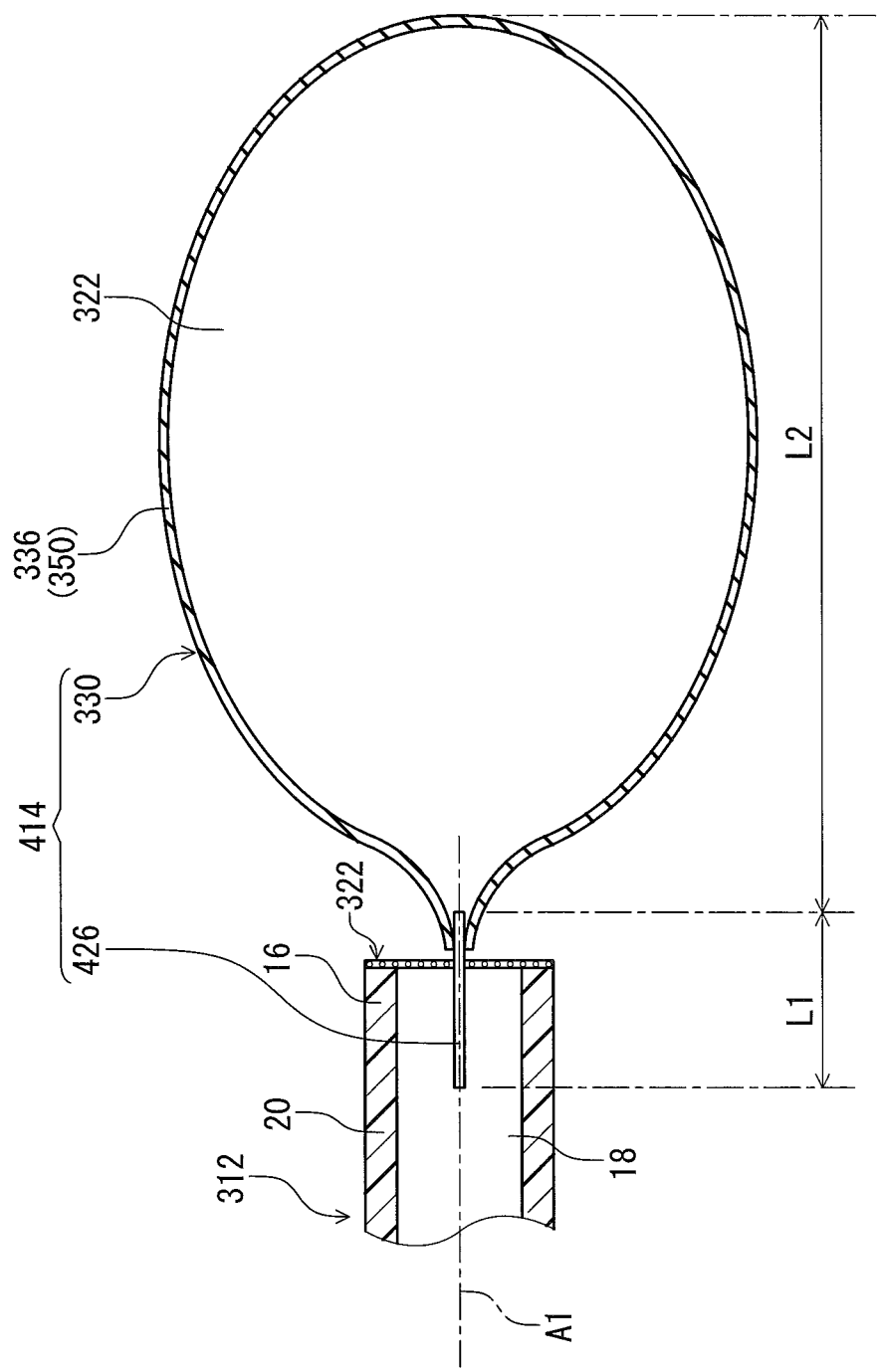
FIG. 14 is a partial cross-sectional view of the bicycle hydraulic hose assembly illustrated in FIG. 11.

As seen in FIG. 14, the bicycle hydraulic hose cap 414 comprises a hose attachment 426 to be detachably attached to the end 16 of the hydraulic hose 412. The hose attachment 426 is attached to the balloon 350 of the reservoir 330. In this embodiment, the hose attachment 426 comprises a needle including a hole. The hose attachment 426 is made of a metallic material. The hose attachment 426 extends through one of the holes 422C of the mesh part 422 in an attachment state where the bicycle hydraulic hose cap 414 is attached to the end 16 of the hydraulic hose 12.

With the bicycle hydraulic hose assembly 410 and the bicycle hydraulic hose cap 414, it is possible to obtain substantially the same effects as those of the bicycle hydraulic hose assembly 310 and the bicycle hydraulic hose cap 314 of each of the first and third embodiments.

Fifth Embodiment

A bicycle hydraulic hose assembly 510 comprising a bicycle hydraulic hose cap 514 in accordance with a fifth embodiment will be described below referring to FIG. 15. The bicycle hydraulic hose cap 514 has the same structure as that of the bicycle hydraulic hose cap 14 except for the hose attachment 26. Thus, elements having substantially the same function as those in the first embodiment will be numbered the same here, and will not be described and/or illustrated again in detail here for the sake of brevity.

As seen in FIG. 15, the bicycle hydraulic hose cap 514 has substantially the same structure as that of the bicycle hydraulic hose cap 14 of the first embodiment. Unlike the bicycle hydraulic hose cap 14 of the first embodiment, however, the bicycle hydraulic hose cap 514 further comprises an additional hose attachment to be detachably attached to an end of an additional hydraulic hose. In this embodiment, the bicycle hydraulic hose cap 514 further comprises additional hose attachments 527 to be detachably attached to ends 517 of additional hydraulic hoses 513, respectively. However, the bicycle hydraulic hose cap 514 can comprise at least one additional hose attachment 527.

The additional hose attachment 527 includes an additional attachment hole 529 in which the end 517 of the additional hydraulic hose 513 is inserted. The additional hose attachment 527 has substantially the same structure as that of the hose attachment 27. The additional hydraulic hose 513 has substantially the same structure as that of the hydraulic hose 12. The additional hose attachment 527 includes an additional communication hole 535 connecting the additional attachment hole 529 to the fluid chamber 32.

With the bicycle hydraulic hose assembly 510 and the bicycle hydraulic hose cap 514, it is possible to obtain substantially the same effects as those of the bicycle hydraulic hose assembly 10 and the bicycle hydraulic hose cap 14 of the first embodiment.

Furthermore, the additional hose attachment 527 allows the hydraulic hose 12 to share the bicycle hydraulic hose cap 514 with the additional hydraulic hose 513. Accordingly, it is possible to ship the bicycle hydraulic hose assembly 510 with a plurality of hydraulic hoses.

It will be apparent to those skilled in the bicycle field from the present disclosure that the above embodiments can be at least partially combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hydraulic hose cap comprising:
a hose attachment to be detachably attached to an end of a hydraulic hose; and
a reservoir including a fluid chamber having a variable internal volume, the fluid chamber being connected to a fluid passageway of the hydraulic hose in an attachment state where the hose attachment is attached to the end of the hydraulic hose, the reservoir including a deformable portion which is elastically deformable, wherein
the hose attachment includes an attachment hole in which the end of the hydraulic hose is inserted and a communication hole connecting the attachment hole to the fluid chamber, the communication hole having a diameter that is smaller than a diameter of the attachment hole.

2. The bicycle hydraulic hose cap according to claim 1, wherein
the deformable portion is elastically deformable so as to vary the variable internal volume.

3. The bicycle hydraulic hose cap according to claim 2, wherein
the reservoir includes a tubular part extending from the hose attachment, and
the tubular part includes the deformable portion.

4. The bicycle hydraulic hose cap according to claim 2, wherein
a maximum thickness of the deformable portion is smaller than a maximum thickness of the hose attachment in a radial direction defined relative to a center axis of the end of the hydraulic hose.

5. The bicycle hydraulic hose cap according to claim 1, wherein
an inner diameter of the communication hole is in a range from 0.1 mm to 3 mm.

6. The bicycle hydraulic hose cap according to claim 1, wherein
the attachment hole has a first axial length in an axial direction,
the fluid chamber has a second axial length in the axial direction, and
the second axial length is larger than the first axial length.

7. The bicycle hydraulic hose cap according to claim 6, wherein
a rate of the second axial length to the first axial length is in a range from 110% to 400%.

8. The bicycle hydraulic hose cap according to claim 1, wherein
the attachment hole includes a first center axis,
the diameter of the attachment hole is a first diameter relative to the first center axis,
the fluid chamber has a second diameter relative to the first center axis, and
the second diameter is larger than the first diameter.

9. The bicycle hydraulic hose cap according to claim 8, wherein
a rate of the second diameter to the first diameter is in a range from 105% to 200%.

10. The bicycle hydraulic hose cap according to claim 1, wherein
the reservoir is integrally provided with the hose attachment as a one-piece unitary member.

11. The bicycle hydraulic hose cap according to claim 1, wherein
the reservoir includes
a reservoir body including a cylinder connected to the fluid passageway of the hydraulic hose in the attachment state where the hose attachment is attached to the end of the hydraulic hose, and
a piston movably provided in the cylinder, and
the fluid chamber is defined by the reservoir body and the piston in the cylinder.

12. The bicycle hydraulic hose cap according to claim 11, wherein
the reservoir body is integrally provided with the hose attachment as a one-piece unitary member.

13. The bicycle hydraulic hose cap according to claim 1, wherein
the reservoir includes a balloon, and
the fluid chamber is provided in the balloon.

14. The bicycle hydraulic hose cap according to claim 13, wherein
the balloon is integrally provided with the hose attachment as a one-piece unitary member.

15. The bicycle hydraulic hose cap according to claim 1, further comprising:
an additional hose attachment to be detachably attached to an end of an additional hydraulic hose.

16. A bicycle hydraulic hose assembly comprising:
a hydraulic hose including a fluid passageway; and
a bicycle hydraulic hose cap comprising:
a hose attachment to be detachably attached to an end of the hydraulic hose; and
a reservoir including a fluid chamber having a variable internal volume, the fluid chamber being connected to the fluid passageway of the hydraulic hose in an attachment state where the hose attachment is attached to the end of the hydraulic hose, wherein
the hose attachment includes an attachment hole in which the end of the hydraulic hose is inserted and a communication hole connecting the attachment hole to the fluid chamber, the communication hole having a diameter that is smaller than a diameter of the attachment hole.

17. The bicycle hydraulic hose assembly comprising:
a hydraulic hose including a fluid passageway; and
a bicycle hydraulic hose cap comprising:
a hose attachment to be detachably attached to an end of the hydraulic hose; and
a reservoir including a fluid chamber having a variable internal volume, the fluid chamber being connected to the fluid passageway of the hydraulic hose in an attachment state where the hose attachment is attached to the end of the hydraulic hose, wherein
the hose attachment includes an attachment hole in which the end of the hydraulic hose is inserted,
the hydraulic hose includes
a hose body defining the fluid passageway, and
a film attached to an end of the hose body, the film including a through-hole.

18. The bicycle hydraulic hose cap according to claim 17, wherein
an inner diameter of the through-hole is in a range from 0.1 mm to 3 mm.

19. The bicycle hydraulic hose cap according to claim 1, wherein
the deformable portion includes an outer circumferential periphery of the reservoir.

20. The bicycle hydraulic hose cap according to claim 1, wherein
the hose attachment includes a sidewall disposed about an outer periphery of the communication hole so as to abut a distal end of the hydraulic hose in an axial direction of the hydraulic hose in the attachment state when the hose attachment is attached to the end of the hydraulic hose.

21. The bicycle hydraulic hose assembly according to claim 16, wherein the deformable portion includes an outer circumferential periphery of the reservoir.

22. The bicycle hydraulic hose assembly according to claim 16, wherein the hose attachment includes a sidewall disposed about an outer periphery of the communication hole so as to abut a distal end of the hydraulic hose in an axial direction of the hydraulic hose.

* * * * *